March 2, 1965   G. T. RANDOL   3,171,257
COMPOUND MASTER CYLINDER FOR HYDRAULIC BRAKE SYSTEMS
Filed Jan. 12, 1962   3 Sheets-Sheet 1

Inventor

March 2, 1965 G. T. RANDOL 3,171,257
COMPOUND MASTER CYLINDER FOR HYDRAULIC BRAKE SYSTEMS
Filed Jan. 12, 1962 3 Sheets-Sheet 2

*Inventor*

March 2, 1965  G. T. RANDOL  3,171,257
COMPOUND MASTER CYLINDER FOR HYDRAULIC BRAKE SYSTEMS
Filed Jan. 12, 1962  3 Sheets-Sheet 3

*Inventor*

United States Patent Office 3,171,257
Patented Mar. 2, 1965

3,171,257
COMPOUND MASTER CYLINDER FOR HYDRAULIC BRAKE SYSTEMS
Glenn T. Randol, 3 E. 2nd Ave., Loch Lynn,
P.O. Box 275, Mountain Lake Park, Md.
Filed Jan. 12, 1962, Ser. No. 165,928
8 Claims. (Cl. 60—54.6)

This invention relates to fluid pressure systems such as the hydraulic brake system for automotive vehicles and the like, the invention having particular reference to a novel and improved compound master cylinder unit for producing a two-stage pressurizing function on the fluid column connected to the several remotely located wheel cylinders in the vehicle brakes, and which constitutes an improvement on the compound master cylinder disclosed in my earlier filed application Serial No. 126,404 filed June 16, 1961.

In my earlier filed application I have disclosed a novel compound master cylinder comprising a low-pressure cylinder which utilizes the conventional single-stage master cylinder body in operative association therewith to produce a high-pressure cylinder, such arrangement making an attractive replacement item for installation on aftermarket cars equipped with a firewall mounted master cylinder operated from the pendant-type pedal. The present invention, however, is concerned with a compound master cylinder in which the working parts are contained in a unitary body for compactness to replace the conventional master cylinder and therefore equally suitable for original equipment or as an accessory.

Therefore, the improvement over my earlier developed compound master cylinder referred to, comprises a unitary body provided with a fluid reservoir and a cylindrical bore coaxial with a smaller diameter bore formed in a detachable sleeve fixed in said cylindrical bore, complemental pistons reciprocably mounted in said bores to produce a low- and a high-pressure cylinder respectively which are disconnectible and interconnectible by a simplified systems of passages controlled by a pottet-type staging valve having a "snap-action," to produce a two-stage operating function on the brake fluid to enable initial displacement of operating fluid at low pressure and high velocity, and a transition effected by said staging valve to high pressure and low velocity upon a predetermined back-pressure being encountered in the brake system whereby the slack in the system may be quickly taken up in response to incremental initial brake-pedal movement, and thereafter the brakes may be applied with proportionally greater pressure or effective leverage between the brake-pedal and the brakes.

Another important object is to provide a compound master cylinder unit of the class described, wherein movement of the staging valve between its two operating positions of control is characterized by "snap-action" induced by hydraulic pressure differential with one of said operating positions supplemented by spring pressure, said "snap-action" providing positive positioning of said valve for a more sensitized valve-actuation thus contributing an appreciably shortened transitional period between low- and high-pressure operations and therefore minimal overall pedal travel free of sponginess at the transitional stage.

Another object is to provide a compound master cylinder unit of the class described wherein the various chambers and pistons are sealed with commercial types of cups, O-rings, etc. thus eliminating specially constructed seals and retainers therefor with resultant reduction in the cost of the unit and proven sealing efficiency.

A further object is to provide improved porting from the reservoir, and between the low- and high-pressure cylinders and staging valve whereby fluid compensation to both cylinders is provided between braking actions so that any fluid which may have been forced back into the reservoir or otherwise lost from the system is replenished thus preventing cavitation in the brake lines.

A still further object is the provision of an improved and simplified friction and fluid-pressure actuated compensating valve for the low pressure cylinder, and wherein the frictional actuating element is directly connected to the valve element to actuate the same to control the passages communicating with the fluid supply reservoir in response to incremental reciprocable movements of the low-high piston assembly defining closely positioned stations along the full operating stroke of said assembly to produce a positive and highly sensitive operation for disabling and conditioning the operation of the low-pressure cylinder.

Another salient feature of my invention is to provide in a compound master cylinder of the class described, a high-pressure piston of conventional construction and operation wherein fluid is drawn from the reservoir via the low-pressure cylinder across the lip of the cup seal via flutes in the peripheral surface thereof which communicate with a plurality of circumferentially spaced passages through the piston head, the ends of said passages adjacent the back of the cup seal being opened and closed by a washer- or star-like valve, to enable compensation of fluid in the high-pressure working chamber to maintain said chamber filled at all times.

Still another object is to provide a modified cylinder body having a detachable cover for closing the forward pressure excursion end thereof to facilitate assembly and machining operations and wherein the residual pressure check-valve and associated discharge outlet are incorporated.

And a still further additional object is to provide a modified high-pressure piston adapted to actuate the poppet-type staging valve directly to effect transition from low- to high-pressure braking operation in lieu of the diminutive valve actuating piston shown in the main embodiment, and thereby eliminate sealing problems in connection with said valve actuating piston as well as the additional parts and machining operations required in the manufacture of such an actuating piston.

With these and other objects and advantages in view, my invention consists in the construction, arrangement and combination of the various parts disclosed herein which will more fully appear from the following description taken in connection with the accompanying drawings wherein like reference characters designate like parts and assemblies throughout the several views in which.

Figure 8:
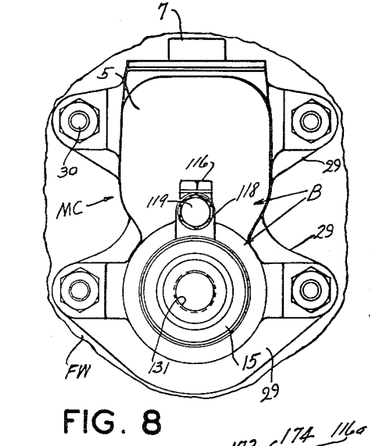
FIGURE 8 is a front elevation showing the unit mounted on the vehicle firewall in the engine compartment.

On the accompanying drawings I have used the reference character MC to indicate as a whole a compound master cylinder operatively incorporating the components comprising the present invention. This novel compound master cylinder is preferably of the type for mounting on the engine side of the vehicle firewall FW (see FIGURE 8), for operation by an operator-operated member disclosed herein as a suspended-type brake-pedal P attached by a suitable bracket indicated by a fragmentary portion BR to the opposite side of the firewall whereby the pedal push-rod PR transmits operator force to the operating parts of the master cylinder in a well known manner to pressurize the brake fluid therefore operate the vehicle brakes.

Figures 1, 1A, 1B, 2, 3, 4:
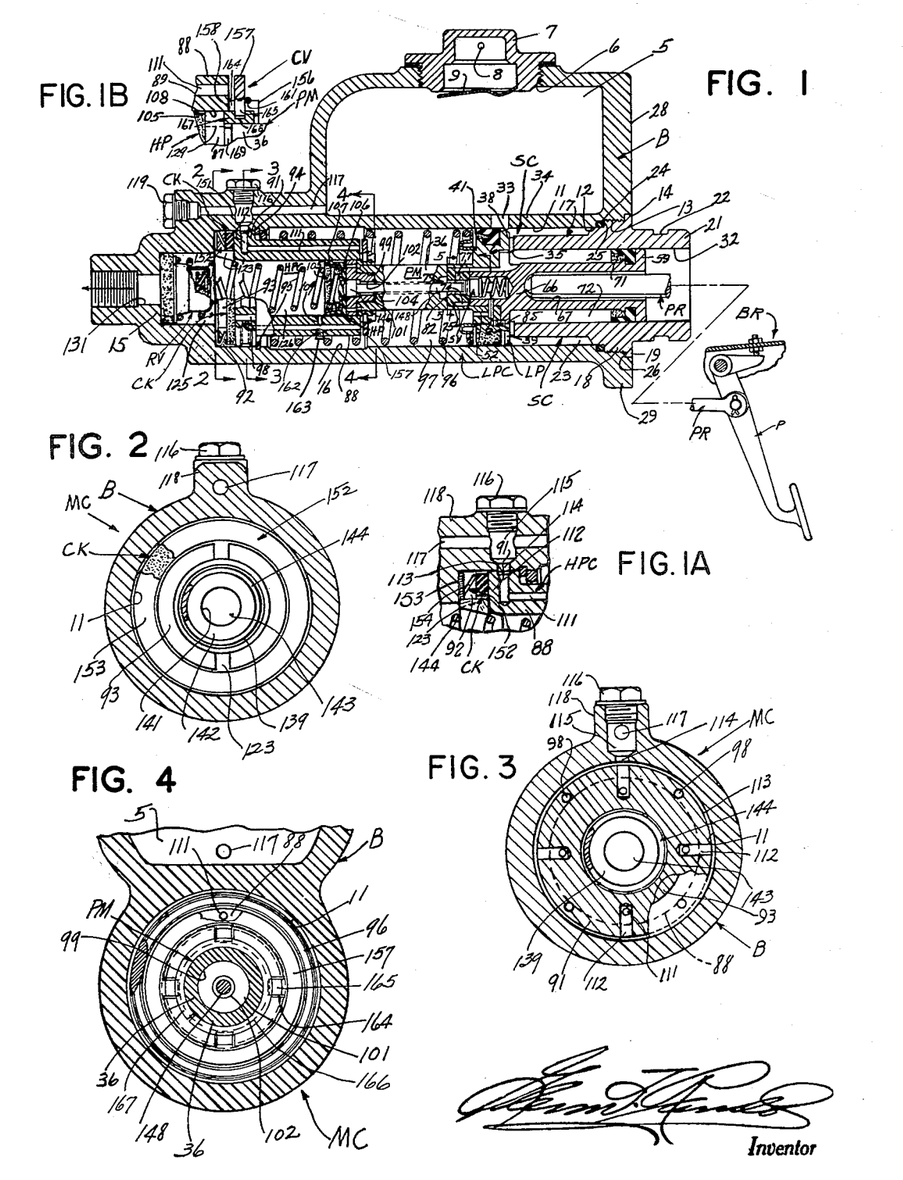
FIGURE 1 is a longitudinal vertical section of my novel and improved compound master cylinder constructed in accordance with the principles of the present invention, applied to operate the hydraulic brake system with which automotive vehicles and the like are conventionally equipped, the parts being shown in normal positions corresponding to brakes "off"
FIGURE 1A is a fragmentary portion of FIGURE 1 on an enlarged scale to clarify details of the high-pressure check-valve means.
FIGURE 1B is a fragmentary portion of FIGURE 1 on an enlarged scale to clarify structural details of the low-pressure compensating valve means.
FIGURE 2 is a transverse section taken on an enlarged scale along the line 2—2 of FIGURE 1 showing details of the high-pressure check-valve.
FIGURE 3 is another transverse section taken on an enlarged scale along the line 3—3 of FIGURE 1 showing the porting arrangement between the reservoir and low- and high-pressure cylinders.
FIGURE 4 is another transverse section taken on an enlarged scale along the line 4—4 of FIGURE 1 showing particulars of the novel frictionally-operated compensating check-valve for the low-pressure cylinder.

The master cylinder in the illustratd embodiment is formed as an integral body generally designated B having a gravity-type fluid reservoir 5 as shown in FIGURE 1 provided with an internally threaded opening 6 to facilitate filling, which opening is closed by a complementally threaded hollow cap 7, all of conventional construction and use, said cap being provided with an air vent 8 to maintain the interior of the reservoir at atmospheric pressure, and a baffle member 9 to prevent fluid surge within the reservoir from excursion through said vent. The lower cylindrical portion of the body is provided with a longitudinal bore 11, open at one end (rear) 12 defined by first and second counterbores 13, 14 respectively, and closed at its opposite (forward) end by a cup-shaped wall 15 formed with a cylindrical embossment having a circular hollow coaxial with said bore, and a reduced extension projecting forwardly from said embossment as shown, said bore being interrupted by an intermediate forward enlarged diameter portion 16 having an unfinished cylindrical surface. The open end of said bore is fitted with an elongated tubular member 17 having its rear (right) end portion defined by two stepped circular flanges 18, 19, with flange 18 externally threaded into engagement with complemental internal threads formed in said first counterbore 13, and said flange 19 engages said counterbore 14. A cylindrical hollow hub 21 projects rearwardly from and integrally with said flange 19, said hub being provided with an external annular groove 22 for reception of the forward anchor bead of a dust excluding boot (not shown).

The normal body portion of the tubular member 17 telescopically projects forwardly from the flange 18 into the rear portion of the bore 11, the external diameter of said body portion being substantially less than that of the bore 11 to form therewith a constant pressure fluid chamber 23 of annular configuration as shown in FIGURE 1, and in the assembled status of said member with the body B, the mating surfaces of said circular flanges 18, 19 and counterbores 13, 14, respectively, are sealed against fluid loss from the reservoir to rthe exterior, by a commercial packing (O-ring) 24 subjected to compression between the inner end of the first counterbore and an internal annular shoulder 25 formed at the juncture of the inner end of the threaded flange and normal body portion of said member as shown. Juncture of said counterbores provide another internal annular shoulder 26 against which the confronting face of the flange 19 abuts with the outer face of said flange flush with the face 28 of a flange 29 integral with and defining the rear end of the body B for mounting the master cylinder MC, for example, on the forward (engine) side of the firewall FW by means of a plurality of mounting bolts 30 projecting through holes in the flange 29, firewall, and pedal bracket BR on the opposite (driver) side of said firewall (see FIGURES 1 and 8).

The fixed tubular member 17 is provided with an inner finished cylindrical surface 32 coaxial with the bore 11, the latter being communicable with the reservoir 5 via an intake port 33 which passes through the wall 34 separating the reservoir from said bore. Thus the bore 11 therefore annular chamber 21, has continuous communication with the fluid in the reservoir, and the inner end of the tubular member 17 is diametrically slotted at 35 to maintain fluid communication between said chamber 21 and the interior of said tubular member as shown.

A large diameter low-pressure piston generally indicated at LP slidably interfits that portion of the bore 11 forward of the inner end of said tubular member, and normally abuts the latter when disposed in its inoperative position as shown in FIGURE 1, said piston and the cylindrically walled portions of the body B in which said piston reciprocates produces a low-pressure unit or cylinder designated as a whole LPC. The low-pressure piston structurally comprises: an integral forwardly extending cylindrical piston-carrying structure or member generally designated PM coaxial with and of smaller diameter than the piston LP, and for flexibility in terminology said piston member may be more specifically termed a forward cylindrical extension identified by the numeral 36; a flanged body 38 incorporates a peripheral chamfered rear edge 39 so as not to block fluid flow from the reservoir via the port 33 to the slots 35 when the piston LP is in normal inoperative position, a forwardly disposed peripheral recess 41, an external annular groove 42 in the horizontal surface of said recess to form a vertical surface 43 which interconnects said groove and recess, a complemental pliant seal 44 comprising an inner and an outer concentrically spaced annular lip 45, 46, respectively, interconnected by a vertical wall 47 with the inner lip fiitted under tension into said groove and the vertical wall in abutting relationship with the vertical surface 43 to effectively seal the peripheral surface of the piston LP in working relationship with the finished surface of the bore 11; first, second and third counterbores 48, 49, 50, respectively, are provided in the piston body 38, with the third counterbore terminating flush with the rear (right) face of the piston LP in abutment with the inner end of the tubular member 15 as shown in FIGURE 1; an arcuate concavity 51 is provided in the second counterbore which is in continuous fluid communication with the forward (left) side of the piston LP via a plurality of horizontally disposed passages 52; and an annular offset 53 is provided on the forward side of the body 38 which supports the horizontal wall 54 of the looped portion of an annular spring seat member 55 terminating in a peripheral vertical flange 56.

Figure 5:
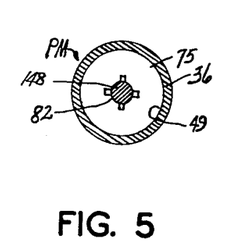
FIGURE 5 is another transverse section taken on an enlarged scale along the line 5—5 of FIGURE 1 showing details of the support means for the end of the valve actuating rod adjacent the staging valve.
Figure 6:
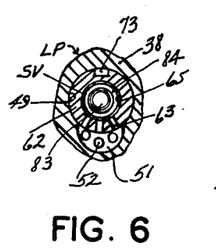
FIGURE 6 is another transverse section taken on an enlarged scale along the line 6—6 of FIGURE 1 showing the poppet staging valve and associated passages controlled thereby.
Figure 7:
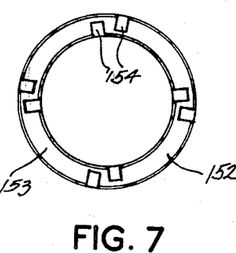
FIGURE 7 is a view of the high-pressure check-valve spring per se.

Extending rearwardly of the piston LP is another coaxial cylindrical extension generally designated 57 and which forms a separate part of the previouslly mentioned piston-carrying member PM. This latter extension slidably projects into the tubular member 15, and structurally comprises: an intermediate outstanding annular flange 58 and a longitudinally spaced fluid-retaining piston 59 of less diameter than the piston LP terminating the rear end thereof, said flanges being interconnected by a reduced diameter cylindrical portion 61, and a further reduced portion 62 projects forwardly of the intermediate flange aforesaid into the second counterbore 49 with the flange 58 interfitting the third counterbore 50 as shown in FIGURE 1. A plurality of ports 63 pass through the wall of the second counterbore to interconnect a blind bore 65 in the portion 62 and the arcuate cavity 51, said blind bore being separated by a wall 66 which defines the closed end of coaxial socket 67 into which the free end of the push-rod PR is inserted into engagement with said wall to actuate the low-pressure assembly LP by the brake-pedal P. An annular external groove 68 is provided in the extension portion 61 adjacent the forward side of the piston 59 for reception of the inner marginal portion of the vertical wall 69 of a single-lip annuar seal 71 to confine the fluid ahead of said fluid-retaining piston 59 within an annular constant pressure fluid chamber 72 disposed between the said flange 58 and piston 59 with the tubular member 17 serving as the outer cylindrical wall therefor, said chamber having continuous communication with the aforesaid chamber 23 circularly aligned therewith with the tubular member 17 defining the inner cylindrical wall thereof, via the end slots 35 in the tubular member 17 when the low-pressure piston LP is fully retracted as shown in FIGURE 1 wherein said piston abuts the inner end of said tubular member to establish the inoperative position of said piston. Chamber 23 is connected at all times to the supply reservoir 5 by means of the intake port 33. Both of the chambers 23, 72 merge to form an annular static chamber "SC," the forward end of which is defined by the righthand side of the piston LP, and which expands without interrupting communication directly with the reservoir 5 via said intake port 33, as the piston LP is protracted from normal position to operating position shown in FIGURE 9. A longitudinal surface channel 73 extends from the inner end of the portion 62 through the flange 58 and a portion of the interconnecting portion 61 of the extension 57, to interconnect the fluid chamber 72 with an annular space 74 formed at one end in the peripheral portion of a collar-like spacer 75 impinged in the second counterbore between an internal annular shoulder 76 formed at the juncture of the first and second counterbore, and the inner end of the portion 62. A port 77 passes through the wall of the collar-like spacer to interconnect the annular space 74 with the axial bore 78 through said collar, said axial bore having continuous communication with the first counterbore which defines an annular fluid space 79 in the forward extension 36. The outer end of the axial bore 78 terminates in an outwardly tapered annular valve seat 81, and the inner end portion of said bore is indented, as shown in FIGURE 5, with a plurality of inwardly projecting circumferentially spaced segments 82 the inner ends of which define a broken circular bearing surface of less diameter than said bore for an important purpose to appear. The spaces between said segments being adapted to interconnect the axial bore 78 with the space 79 thereby accommodating fluid flow between said bore and space. A staging valve-forming element 83 disclosed herein as formed of molded material such as "Teflon," and having a forward end annular face complemental to said valve seat 81, is adapted to move into and out of engagement with said seat to isolate the axial bores 65, 78 and to place the same in communication with each other respectively. An integral reduced extension projects from the rear end of said valve element 83 into a normally preloaded spring 84 to maintain said spring in operating alignment with said valve element and the latter in alignment with its seat when disengaged, said spring being operably disposed in the blind bore 65 between said staging valve element 83 and bottom of the blind bore to urge the valve face toward engagement with its cooperating seat 81 and thereby block fluid communication between said axial bore 78 and said blind bore 65. The aforesaid arrangement of the valve seat 81, valve element 83 and spring 84 form what may be termed a poppet-type staging control valve generally designated "SV" the function of which will be more fully described hereinafter.

Staging valves employed in prior art devices of the character described have the common fault of requiring a relatively longer operating stroke with a tendency to "chatter," that is, vibrate between the two operating positions thereof which causes interruption of progressive build-up of firm pressure reaction on the pedal as braking operation changes from low- to high-pressure operation. Such erratic change in pedal "feel" at the transitional stage gives the operator a sensing of loss-of-brake momentarily until the high-pressure operation becomes firm. To overcome this serious fault, I have produced the above described staging valve SV of novel construction and operation wherein fluid at low pressure is directed against one side of the valve element 83 supplemented by spring presure to stabilize the valve element in normally closed (seated) position thus rendering low working-pressure operative in part, and the opposite side of the valve element is adapted to receive high back-pressure from the actuating-fluid in the brake system to establish the open (unseated) position of said element to render the low-pressure cylinder inoperative so that high-pressure braking can be utilized with reduced pedal effort to firmly apply the brakes as required. Such novel use of hydraulic pressure differential for operating the staging valve imparts a "snap-action" thereto to not only sensitize valve-actuation but also to effect the transitional phase in the shortest possible time so that as the operator presses the brake-pedal through such phase, pressure reaction on the pedal continues firm without any noticeable sponginess attended by a "feel" of loss-of-brake until the high-pressure operation becomes firm.

The flange 58 and portion 62 as well as the collar-like spacer 75 are preferably pressfitted into their respective counterbores to effect a fluid-tight seal therebetween, and to prevent fortuitous separation between the low-pressure piston body 38 and the rearward extension 57, a plurality of cap screws 85 are threaded into holes 86 as shown with the portion of the holes in the flange 58 and third counterbore 50 being split therebetween as shown. It is thus seen that the extension 57 is readily removed to permit inspection of and repairs to the parts comprising the staging valve SV. To assemble the staging valve SV, the collar-like spacer 75 is first inserted into the first counterbore 48, then the ball 83 and spring 84 placed in position in the blind bore 65, and lastly the portion 62 is pressfitted into the second counterbore 49 along with the flange 58 into the third counterbore 50 and the extension 57 then secured in position on the low-pressure piston LP by the attaching cap screws 85.

The forward end portion of the piston-carrying extension 36 is provided with a detachable flanged member 87 which normally projects into the rear end of a detachable high-pressure cylinder-defining sleeve member 88 to have working relation with the inner finished surface 89 of said sleeve member, the outer cylindrical surface of said sleeve member being spaced from and substantially in circular alignment with the intermediate enlarged portion 14 of the bore 11, with the forward end of said sleeve member terminating in an outstanding flange 91 which fits in close tolerance sealed relation with the forward terminating portion of the bore 11, the forward side of said flange being spaced from the inner side of the bore end wall 13 as shown to provide an annular space 92 therebetween, the inner circular wall of said space being defined by a reduced diameter extension 93 projecting from the forward end of and integral with said flange 91 into abutment with the inner face of said end wall 13 to establish said sleeve member 88 in its axially fixed position with respect to the bore 11. An internal annular groove 94 is provided in the surface of the bore 11 adjacent the rear (right) side of the flange 91, said groove being engaged by a split retaining ring 95 to stabilize the sleeve member 88 in axially fixed disposition with respect to the bore 11 and cylindrical wall thereof. A normally preloaded compression spring 96 operably spans the space between said retaining ring and the vertical wall 56 of the spring seat member 55 to react between them and thereby bias the low-pressure piston LP and piston-carrying member PM toward normal inoperative position as shown in FIGURE 1. The forward portion of this spring encircles the sleeve member 88 proper, and as shown in FIGURE 1, the forward side of the low-pressure piston defines the rear end of a low-pressure working chamber 97 which assumes a forward annular configuration between the sleeve member 88 and enlarged bore portion 14, said piston LP being capable of varying the volume of fluid in said chamber and pressurizing the same, and thereby displace fluid at low pressure and high velocity as will appear, said chamber 97 having continuous communication with the blind bore 65 via the passages 52, concavity 51 and ports 63, all as clearly shown in FIGURE 1. A plurality of circumferentially spaced passages 98 pass through the flange 91 to interconnect the low-pressure chamber 97 with the annular fluid space 92, said passages being adapted to convey fluid at low pressure and high velocity from the low pressure chamber 97 into the annular space 92. The forward end of the piston-carrying extension 36 is counterbored at 99 to receive a press-fitted reduced diameter portion 101 integral with the aforesaid flanged member 87 whereby the piston-carrying member PM and member 87 move as a unit. This flanged member is axially bore at 102 which merges with a counterbore 103 terminating flush with the forward face of said flange 87, and an axial bore 104 in the memebr PM interconnects the axial bore 102 and annular space 79 as shown.

The forward end face of the flanged member 87 is equipped with a pliant cup seal 105 having a vertical wall 106 provided with a horizontal peripheral lip 107 in working contact with the inner finished surface 89 of the sleeve member 88. The outer surface of the lip is indented with a plurality of longitudinal flutes 108, and the forward edge of the lip normally lies slightly spaced to the rear (right) of a compensating port 109 which communicates with one of a plurality of circumferentially spaced longitudinal compensating passages 111 incorporated in the wall of sleeve member 88, for the low-pressure cylinder LPC, and which are arranged inwardly radially of the passages 98 in radially staggered relation thereto as shown in FIGURES 1 and 3. Passages 111 extended from the rear (right) end of the sleeve member 88 to a point whereat they intersect a corresponding number of aligned blind radially disposed passages 112, the outer open ends of the latter passages communicating with an annular fluid channel 113 in the peripheral surface of the sleeve flange 91 (see FIGURE 3), said channel having continuous communication with a passage 114 opening into a vertical counterbore 115 which is internally threaded at its upper end portion to receive a complementally threaded closure plug 116. A horizontal passage 117 is provided in a longitudinal embossment 118 integral with the upper side of the cylinder portion of the master cylinder body. This latter passage is intersected by the vertical passage 114, and is closed at its outer (left) end by a threaded closure plug 119 engaging a complementally threaded outer portion of a counterbore 121 merging with said horizontal passage 117, with the inner end of this latter passage opening into the reservoir 5 as shown, whereby fluid in the reservoir has continuous communication with the annular channel 113 therefore the passages 112, 111 via the passage 114, counterbore 115 and passage 117.

That portion of the inner surface 89 in the sleeve member 88 forward of the cup seal 105 terminates in an outwardly flared portion 122 coextensive with the extension 93, which is cross-slotted at 123 to provide communication between the annular space 92 and interior of said sleeve member 88. The flared portion of the high-pressure sleeve member 88 defines with the hollow in the end wall 13 a discharge chamber 125 which merges with a high-pressure chamber 126, the rear (right) end of the latter chamber being defined by the cup seal 105 as shown. The cup seal 105 and flanged member 87 combine to form a high-pressure piston generally designated HP, which is of relatively smaller diameter than the low-pressure piston LP. The high-pressure piston reciprocably operates within the sleeve member 88, the latter forming the high-pressure unit or cylinder generally designated HPC.

The heel portion of the seal lip 107 is offset at 127 to receive a washer-like valve element 128 preferably bonded to the cup to control a plurality of fluid passageways 129 through the flanged member (headland) 87 which accommodate flow of fluid via the flutes 108 between the high-pressure chamber 126 and the low-pressure working chamber 97. The washer-like valve 128 therefore functions to seal off fluid from entering the high-pressure chamber therefore the discharge chamber when the passageways 129 are closed at the seal end, closure of these passageways being effected by joint pressure reaction from the chambers 125, 126 induced jointly by the low and high pistons LP and HP, respectively, or by the latter piston alone when a firm set-up of the vehicle brakes is desired. These passageways are opened by withdrawal of the washer-like valve 128 from the cooperating ends of the said passageways when the brakes are taken "off," such opening of the passageways being induced by a temporary partial vacuum condition created within the chambers 125, 126 to thus draw fluid from the reservoir via the low-pressure chamber 97 to prevent cavitation therein and therefore maintain the hydraulic system filled while taking the brakes "off," whereupon, the compensating port 109 is opened (uncovered) thus enabling any excess fluid in the brake system to return to the reservoir via the connected low-pressure cylinder compensating passage 111 best demonstrated in FIGURE 1. In this manner excess or lack of fluid is compensated for in the high-pressure cylinder HPC in readiness for another brake-applying operation.

The conventional residual pressure check-valve generally designated RV is nested in the hollow of said end wall 13 in operative associate with a discharge port 131 through the end wall of said hollow and forward extension as shown, said port being connected to the hydraulic lines (not shown) leading to the several remotely located wheel cylinders (not shown) for operating the wheel brakes (not shown). The residual check-valve RV is of conventional construction and operation and therefore functions to establish the minimal brake line pressure of 6-8 p.s.i., and displacement of fluid from chamber 125 into the discharge port 131 as is understood.

A complemental cup-shaped spring seat 139 fits within the cup-like seal 105. A central hole 141 is provided through the bottom wall 142 of said seat 139 through which a dome-shaped embossment 143 forming the central portion of the vertical wall 106 of the seal 105 protrudes. A normally preloaded compression spring 144 is operably disposed within the chambers 125, 126 and reacts between the residual check-valve flange 136 and spring seat 139 to control said residual pressure check-valve RV and maintain the high-pressure cup seal 105 against the face of the headland 87 whereby said spring serves to bias the high- and low-pressure piston assemblies toward inoperative positions as shown in FIGURE 1.

Figure 9:
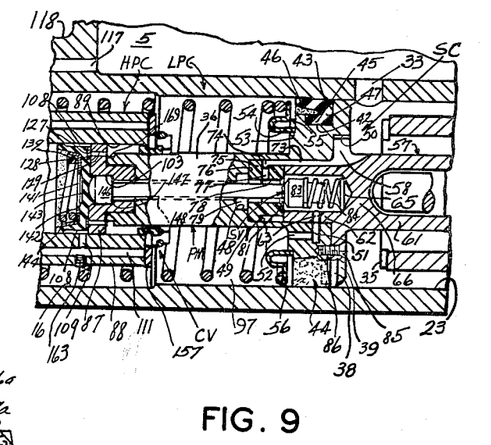
FIGURE 9 is a fragmentary view on an enlarged scale of FIGURE 1 showing an operating status wherein the high-pressure operation is activated.

A valve-actuating piston 146 slidably interfits the counterbore 99 at the forward end of the extension 36, and is normally spaced at its rear (right) end from an annular internal shoulder 147 formed at the juncture of the counterbore 99 with the axial bore 102, to define the operating movement of the actuating piston relative to the piston-carrying member PM. The forward end of the piston 146 is dome-shaped corresponding to the complemental hollow of the embossment 143 whereby back-pressure from the chambers 125, 126 reacts on the dome portion 143 of the cup seal 105 to force the piston 146 rearwardly into abutment with the shoulder 147, said piston having a reduced coaxial extension (rod) 148 extending rearwardly through the axial bores 102, 104 to act on the staging valve 83 to thereby displace said valve a corresponding distance from its cooperating seat 81 to open position as shown in FIGURE 9, thus interconnecting the low-pressure working chamber 97 with the constant pressure chamber SC via passages 52, concavity 51, ports 63, blind bore 65, axial bore 78, annular space 74, port 77 and channel 73, all as shown in FIGURE 1. Interconnection of the chambers 97 and SC disables the pressurizing function of the low-pressure cylinder LPC and thus effects transition from the low- to the high-pressure cylinder upon a predetermined back pressure developed in the chambers 125, 126.

The rear (right) end portion of the valve-actuating extension 148 is slidably supported in the broken circular surface defined by the segments 82 in the collar-like spacer 75, and the spaces between said segments provide fluid flow between the fluid space 79, and axial bore 78 in said spacer, while the forward end portion of said valve-actuating extension is preferably integral with the valve-actuating piston 146. The extension 148 is preferably of slightly smaller diameter than the diameters of the coaxial bores 102, 104 through which it passes, to enable fluid communication between the rear (right) end of said piston and the fluid space 79 so that any seepage past the pistons 146 and HP is conveyed back to the constant pressure chamber 72 for recirculation through the chambers 97, 125, 126.

High-pressure check-valve means generally designated CK are associated with the forward face of the flange 91 of the fixed sleeve member (high-pressure cylinder) 88, and comprise: an annular valve-forming element 151 slidably mounted on the extension 93 within the space 92 to close the forward (left) ends of the passages 98 under the influence of a ring-like spring 152 (see FIGURE 2) positioned in that portion of the space 92 between said end wall 13 and valve element 151, said spring being formed by an annular segment 153 having a plurality of lateral circumferentially spaced yieldable fingers 154 overlapping in pairs to apply balanced pressures against the side of said valve element 151. As shown in FIGURES 1 and 1A, this check-valve is operative to accommodate fluid flow from the low-pressure working chamber 97 into the chambers 125, 126 until a predetermined back-pressure in these two latter chambers inhibits unseating of the element 151 from the face of the flange 91 and thereby maintains said passages closed during inoperative status of the low-pressure cylinder LPC, and under no circumstances can fluid return via passages 98 from the chambers 125, 126 into the low-pressure working chamber 97. It is thus seen that this high-pressure check valve is operative under spring influence to accommodate fluid flow from the low-pressure working chamber 97 into chambers 125, 126 but when back-pressure reaches a predetermined magnitude such hydraulic reaction on the element 151 combines with said spring reaction to firmly hold the valve element seated to block fluid flow through the passages 98.

Low-pressure compensating-valve means generally designated CV are operatively associated with the rear (right) end of said compensating passages 111 which open into the low-pressure working chamber 97, to control said passages. Therefore, the passages 111 serve as fluid compensating means for the low-pressure working chamber 97 in a manner similar to the function of the compensating port 109 controlled by the high-pressure displacement member 36. Projecting into the low-pressure working chamber 97, is a reduced portion 156 of the wall of the high-pressure cylinder HPC, formed by diminishing its inner end portion, and on which an annular valve-forming element 157 is mounted for limited sliding movement in confronting relationship to the inner ends of the passages 111 which terminate flush with the face of an annular shoulder 158 formed at the juncture of the high-pressure cylinder wall 88 and said reduced portion 156. The sliding movement of the valve element 157 is defined by the space between said annular shoulder and a split retaining ring 159 spaced from said shoulder, and which engages a broken annular groove 161 on the opposite (right) side of said valve element, said valve element normally abutting said retaining ring when the passages 111 are open (uncovered) as shown in FIGURE 1 to accommodate fluid compensation between said low-pressure chamber 97 and the reservoir 5 via said passages 111, 112, fluid channel 113, passage 114, counterbore 115, and passage 117, all as clearly demonstrated in FIGURE 1. The lowermost passage 111 is intersected by a hole 162 closed with a threaded plug 163, said hole being coaxial with the compensating port 109 for the high-pressure cylinder HPC, to enable drilling this port through the inner portion of the sleeve wall 88 into communication with the interior of said high-pressure cylinder HPC thereby interconnecting this lower passage 111 with the chambers 125, 126 when the lip of the high-pressure piston seal 105 is disposed to the rear (right) of the port 109 to provide fluid compensation between the high-pressure cylinder HPC and the supply reservoir 5 via the same fluid passage system described for the low-pressure cylinder LPC, in the case where the low-pressure compensating valve 157 is engaged with the shoulder 158 (see FIGURE 9) to isolate the ends of the passages 111 from the low-pressure working chamber 97. However, in the event the low-pressure compensating valve 157 is fully retracted to normal position as shown in FIGURES 1 and 1B wherein the low-pressure cylinder LPC is inoperative to pressurize the brake fluid, such fluid compensation for the high-pressure cylinder HPC is effected between the reservoir and both cylinders HPC and LPC since the compensating passages 111 are in communication with the low-pressure working chamber 97 as well as the high-pressure working chamber 126 via the port 109. Thus, full and complete adjustment of the fluid in both cylinders is positively provided.

The reduced wall portion 156 is intended with cross-slots 164 preferably two pairs with each pair being diametrically opposed best demonstrated in FIGURE 4. A plurality of inwardly projecting circumferentially spaced lugs 165 which match the spacing of said cross slots, define the inner periphery of the valve element 157, and project into said slots, respectively. These lugs project through said slots into engagement with an annular groove 166 formed in the peripheral surface of a split ring-like contractible actuating member 167 to provide conjoint axial movement of the compensating valve element 157 and said latter ring. The ring 167 encircles the extension 36 of the piston-carrying member PM, and is characterized by frictional engagement therewith to impart said limited reciprocable sliding movement to the compensating valve element 157 to dispose the same in spaced (open) and abutting (closed) positions of control with respect to the adjacent ends of the compensating passages 111, as shown in FIGURES 1B and 9, respectively.

The depth of the space between the bottom of the groove 166 and the end of the lugs will increase as the actuating ring 167 wear thinner due to slipping engagement with the piston-carrying extension 36 following conjoint movement thereof to actuate the compensating valve CV to its open or closed position of fluid control. The aforesaid opening and closing actuations of the compensating check-valve CV may be effected at any selected position along the full operating stroke of the piston-carrying member PM as a function of incremental reciprocable movements imparted to the latter member, that is to say, a corresponding incremental movement of the low-pressure piston LP in a pressurizing direction effect closure of the passages 111 at the valve element 157 to condition the low-pressure working chamber 97 to pressurize the fluid therein to take-up the slack in the brake system and, upon initial release of the low-pressure piston from any given pressurizing stations aforesaid, such incremental movement inaugurating such releasing of the low-pressure piston LP to take the brakes "off," simultaneously actuates the slip actuating ring 167 to withdraw the connected valve element 157 from the confronting ends of the compensating passages 111 to open the latter and thereby relieve the pressure on the fluid in the low-pressure chamber 97 to that of atmosphere, and thereafter, continued movement of the low-pressure piston back to normally retracted position as shown in FIGURES 1 and 1B, maintains the compensating valve element 157 withdrawn from the cooperating ends of the passages 111, such relative movement of the piston LP being accommodated by slipping engagement of the piston-carrying member PM with respect to the actuating ring 167 while the frictionally actuated valve element 157 is stabilized against its retaining ring 159 as shown in FIGURE 1; and, in a similar manner the compensating valve element 157 is moved into abutting relationship with respect to the shoulder 158 to maintain the ends of the passages 111 closed, along the full pressurizing stroke of the piston LP after initial movement thereof moves the valve element 157 into contact with the said shoulder 158 as shown in FIGURE 9 wherein the valve element 157 is spaced from the retaining ring 159. In this connection it is important to note that the pressure on the fluid in the low-pressure chamber 97, upon closure of the passages 111, cooperates with the movement of the piston-carrying member PM in frictional engagement with the actuating ring 167, to hold the valve element 157 in its closed operating position of fluid control demonstrated in FIGURE 9, said actuating ring 167 actuation of valve element 157 providing the special advantage of moving the valve element 157 with a high degree of sensitivity to either of its two operating positions irrespective of the pressure status of the fluid in the low-pressure chamber 97 when the pistons LP, HP are initially moved to effect such positions. Accordingly, the low-pressure cylinder compensating valve CV is actuatable in response to incremental reciprocable movements at closely spaced stations along the full operating stroke of the low-pressure piston LP therefore the piston-carrying member PM and high-pressure piston HP, supplemented by pressure on the fluid in the low-pressure chamber 97 reacting to assist in holding the compensating passages 111 closed during low-pressure operation.

The forward extreme end of the piston-carrying extension 36 is formed with a reduced diameter portion 169 in communication with the passages 129 through the high-pressure piston headland 87, to facilitate fluid compensation via the lip of the high-pressure piston seal 105 when the rear (right) side of the headland comes into engagement with the split actuating ring 167 upon fully retracting the pistons LP and HP to their respective normal positions shown in FIGURE 1. Therefore, if for any reason frictional actuation of the actuating ring 167 and connected valve element 157 fails wholly or partially, full compensation of fluid in the low-pressure chamber 97 is assured upon the low-pressure piston being fully retracted into inoperative position as shown in FIGURE 1 wherein the headland 87 has engaged and moved the actuating ring 167 to the right to withdraw the valve element 157 from the shoulder 158 thus opening the passages 111.

*Modified cylinder body*

Figure 10:
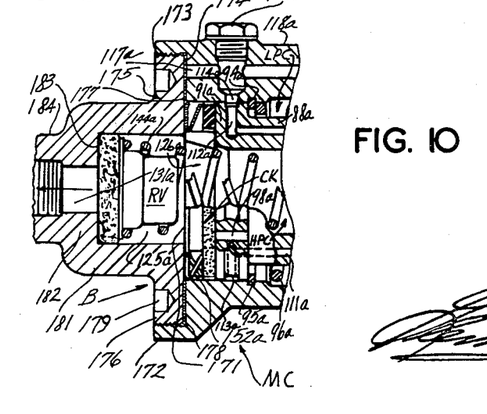
FIGURE 10 is a modified form of the invention wherein the forward end of the low-pressure cylinder is closed by a detachable cap.
Figures 11, 12:
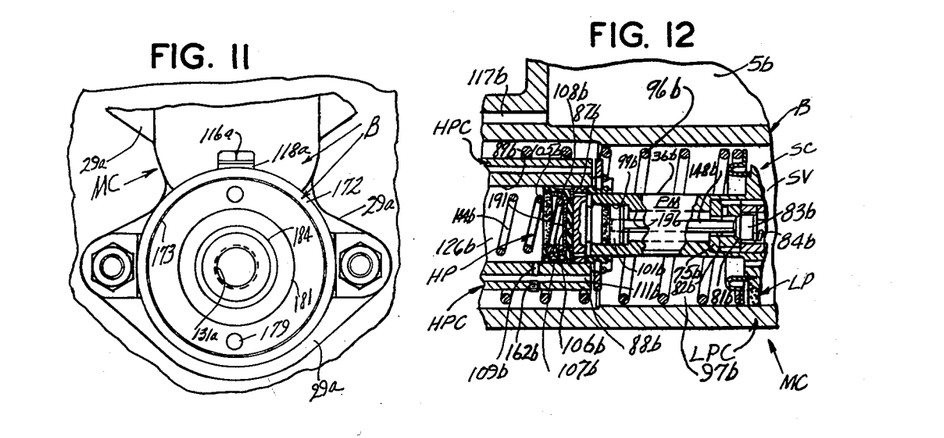
FIGURE 11 is a fragmentary front elevation of the FIGURE 10 modification.
FIGURE 12 is a fragmentary section of FIGURE 1 incorporating another modification of the present invention wherein the high-pressure piston is adapted to control the staging valve upon a predetermined back-pressure reacting on said piston.

In FIGURES 10 and 11 I have illustrated a modified form of the cylinder body and wherein individual parts analogous to those previously described are designated by like reference numerals distinguished, however, by suffixing "a." This modified structure differs from that of the main embodiment by having the longitudinal bore 11a through the lower cylindrical portion of the body B open at its forward (pressure excursion) end 171 which terminates in an outstanding circular embossment 172, the latter being provided with a threaded counterbore 173, the vertical face 174 of which lies in a plane with the high-pressure check-valve spring 152a, and the outer end of the horizontal compensating passage 117a terminates flush with said face as shown in FIGURE 10. A cup-shaped cap 175 is formed with an outstanding flange 176 externally threaded to engage the threads of said counterbore, a complemental annular face 177 on said flange, an annular gasket 178 positioned between said faces 174, 177 to effect an oil-tight seal therebetween when the cap is fully threaded into said counterbore to form a unitary assembly with the master cylinder body B. A pair of diametrically opposed sockets 179 are provided in the opposite (forward) face of said flange for reception of the diverging legs of a spanner wrench to manually rotate said cap into threaded engagement with the said counterbore threads. Projecting from the forward side of said flange is a hollow cylindrical embossment 181 having an end wall 182 with a finished end face 183, said end wall terminating forwardly in a reduced cylindrical extension 184 through which the discharge outlet 131a passes to place the interior of said cap in communication with the brake lines (not shown) as is understood. The residual pressure check-valve RV is nested in the hollow of said cap in operative association with the discharge outlet to function in the same manner and for the same purpose described in connection with the main embodiment (FIGURES 1 through 9).

This modified arrangement of the forward end of the low-pressure cylinder appreciably lowers the cost of machining the forward end portion of the bore 11a, and facilitates assembly of the high-pressure cylinder-defining sleeve 88a and high-pressure check-valve CK, with the added simplification of eliminating the closure plug 119 and associated threaded counterbore 121 since the outer end of the horizontal passage 117a leading to the reservoir 5a is now closed by the overlying gasket 178 as shown in FIGURE 10. A further advantage is provided by the end face 174 on the flange 176 in its assembled status as shown, abutting the forward end of the reduced extension 93a to firmly impinge the high-pressure cylinder flange 91a against the retaining ring 95a and thereby stabilize the said high-pressure cylinder HPC in coaxial relationship with respect to the low-pressure cylinder LPC as shown. Thus, the parts comprising the high-pressure check-valve CK may be readily inspected or replaced by removing the detachable cap 175 which also makes the residual pressure valve RV and the high-pressure piston seal accessible for easy servicing and assembly.

*Modified high-pressure piston*

Figure 13:
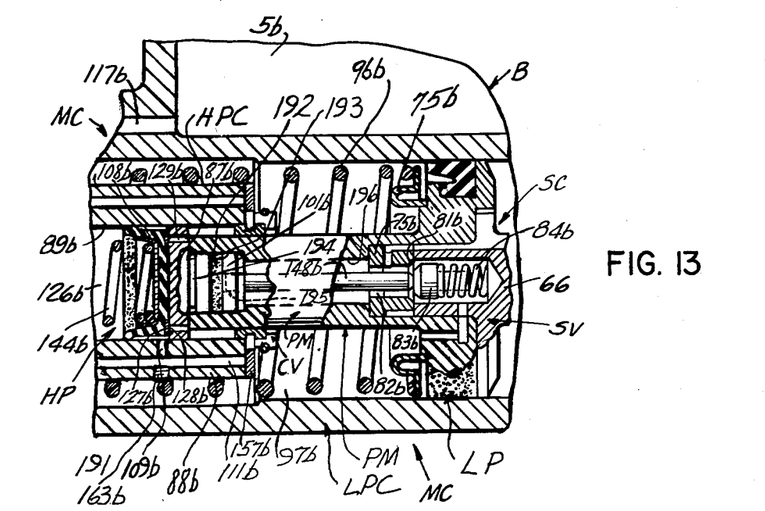
FIGURE 13 is a view similar to FIGURE 12 to clarify the detail and showing an operating status wherein the high-pressure piston has operated the staging valve to effect transition from low- to high-pressure braking operation.

FIGURES 12 and 13 illustrate a modified form of the high-pressure piston HP, and wherein individual parts analogous to those already described are designated by like reference numerals distinguished, however, by the suffix "b." This modified structure eliminates the valve actuating piston 146 shown in the main embodiment by placing its function on the high-pressure piston HP. The forward end 36b of the piston-carrying member PM is formed with the counterbore 99b of greater depth than shown in the main embodiment, and in which the reduced extension 101b on the flange 87b correspondingly lengthened slidably operates, said flange 87b being predeterminately spaced from the extreme end of said piston-carrying member in the normal position shown in FIGURE 12 to define the relative operating movement of the said flange and therefore the high-pressure piston HP with respect to the piston-carrying member PM.

The forward end face of the flanged member 87b is provided with a pliant cup seal 105b having a vertical wall 106b terminating peripherally into a horizontally extending lip 107b in working contact with the inner finished surface 89b of the sleeve member 88b. The outer surface of the lip is indented with a plurality of longitudinal flutes 108b and the forward end of the lip normally lies as shown in FIGURE 12 slightly spaced to the rear (right) of the compensating port 109b which communicates with one of a plurality of circumferentially spaced longitudinal compensating passages 111b for the low-pressure cylinder LPC, and which are arranged inwardly radially of the passages 98b in staggered relation thereto as shown in FIGURE 13, and function in the same manner as described in detail in connection with the main embodiment (FIGURES 1–9).

The heel portion of the seal lip 107b is offset at 127b to receive a washer-like valve element 128b preferably bonded to the cup to control a plurality of passages 129b through the flanged member 87b and which accommodate flow of fluid via the flutes 108b between the high-pressure chamber 126b and the low-pressure working chamber 97b. The washer like valve 128b therefore functions to seal off fluid from entering the high-pressure chamber therefore the discharge chamber when the passageways 129b are closed at the seal end, closure of these passageways being effected by joint pressure reaction from the chambers 125 (see FIGURE 1) and 126b induced jointly by the low and high pistons LP and HP, respectively, or by the latter piston alone when a firm set-up of the vehicle brakes is desired. These passageways open when the washer-like valve is withdrawn from the cooperating ends thereof as the brakes are being taken "off," such opening being induced by a temporary vacuum being created within the chambers 125b, 126b, particularly when the brakes are quickly released, to thus draw fluid from the reservoir 5b via the low-pressure working chamber 97b to prevent cavitation therein and therefore maintain the hydraulic system filled under all operating conditions thereof.

A complemental cup-shaped spring seat 191 fits within the cup seal 105b, and which serves to maintain the seal in engagement with the flanged member 87b and the lip of said seal in engagement with the cylindrical working surface 89b, under influence of spring 144b which controls at its opposite end the residual pressure check-valve RV (see FIGURE 1) as is well understood.

The reduced extension 101b on the flanged member 87b is fitted with an annular packing 192 such as a conventional O-ring engaging a groove 193 therein to prevent seepage past said extension. An annular undercut 194 is made in said extension adjacent the flanged member 87b to facilitate parallel machining of the surface of the extension, and the valve-actuating rod 148b is supported at its forward end in a blind axial bore 195 in the said extension 101b to move as a unit therewith, said rod projecting rearwardly through an axial bore 196 in the piston-carrying member PM, which interconnects said counterbore 99b with the spaces between the segments 82b in spacer collar 75b and therefore the axial bore 78b in said spacer collar.

The rear end portion of the rod 148b is slidably supported on the segments 82b formed in the collar 75b, and the extreme rear end of said rod is normally spaced slightly from staging valve-forming element 83b, and adapted to move said valve-forming element from its cooperating seat 81b to place the working chamber 97b and constant pressure chambers 23, 72 (see FIGURE 1) in communication with each other and thus rendering the low-pressure piston inoperative to move fluid at low-pressure into the discharge chamber 125b. The staging valve 83b and therefore the high-pressure piston HP are biased toward normal position as shown in FIGURE 12 by the normally preloaded spring 84b, thus this spring serves to establish the amount of back-pressure required on the high-pressure piston to actuate the same to open the staging valve, actuating movement of the high-pressure piston relative to the piston-carrying member PM is defined by the flange 87b engaging the extreme end of extension 36b wherein the full operating movement is taken up. Therefore, the end of the extension 36b and flanged member 87b may be termed as a pair of cooperating "abutment-engaging elements" which defines the relative movement between the high-pressure piston and therefore the staging valve 83b in a valve opening direction to the operating positions shown in FIGURE 13 wherein high pressure braking is effective, while normal position of the high-pressure piston with respect to the piston-carrying member PM as shown in FIGURE 12 wherein the staging valve is closed for low-pressure movement of fluid into the discharge chamber 125 via the high-pressure check-valve CK and the relative movement re-established between said high-pressure piston and piston-carrying member, is established by the valve-operating spring 84b in opposition to spring 144b reacting on the high-pressure piston. Accordingly, when the staging valve 83b is engaging its cooperating seat 81b, these two elements may also be termed another pair of cooperating "abutment-engaging elements" to define the high-pressure piston in normally released position wherein the staging valve is closed.

In operation, upon a predetermined back-pressure plus return spring 144b reacting on the high-pressure piston HP, to overcome the preloaded strength of the valve and piston operating spring 84b, said piston moves rearwardly from the position of FIGURE 12 to the position of FIGURE 13, relatively to the piston-carrying member PM to unseat the staging valve 83b as shown in FIGURE 13 to render the low-pressure piston LP inoperative to move fluid at low pressure into the brake system past the high-pressure check-valve CK (see FIGURE 1). The installed strength of the spring 84b is greater than that of spring 144b which must necessarily be limited to control the residual line pressure to approximately 6–8 p.s.i. when the vehicle brakes are off. Therefore, the excess installed strength of spring 84b over spring 144b defines the amount of back-pressure in chamber 125 required to move the high-pressure piston to the position of FIGURE 13. Upon the high-pressure piston HP coming into engagement with the end of the extension 36b, the piston-carrying member PM and piston HP move as a unit to effect a firm setting of the brakes as required under operator effort exerted on the brake-pedal on the piston-carrying member, during which high-pressure braking the low-pressure operation is idle due to the high-pressure piston holding the staging valve 83b open as shown in FIGURE 13.

This modification contributes the special advantage by eliminating the coaxial valve-actuating piston 146, the sealing problems in connection therewith, and provides a wider range of ratio selections between the low- and high-pressure pistons for a more compact unit since the low-pressure piston may be smaller in diameter than in the case of a high-pressure piston equipped with a coaxial piston to actuate the staging valve to open condition, and the high-pressure piston may be made proportionally smaller so that the overall size of the master cylinder unit MC is appreciably smaller than master cylinders of this type in the prior art which utilize an axially bored high-pressure piston fitted with a coaxial valve-actuating piston.

*Operational Summary*

Considering a normal operation, upon depressing the pedal P force is transmitted therefrom through the interconnecting pushrod PR to the low-pressure piston LP, resulting in movement of the piston carrying structure PM on its pressurizing stroke, and also simultaneously advancing piston HP.

During the initial movement of the pistons LP and HP on their pressurizing stroke, the lip 107 of the high-pressure piston seal 105 covers the compensating port 109 to isolate the fluid reservoir 5 from chambers 125, 126, and minute movement is imparted to the compensating-valve element 157 by the actuating ring 167 frictionally engaging the piston-carrying extension 36 to close the confronting ends of the passages 111 thus isolating the reservoir 5 from the chamber 97. In this manner, chambers 125, 126, and chamber 97 are conditioned to pressurize the fluid therein, and thereafter, as the pistons advance in their respective cylinders under operator-actuation, fluid in chamber 97 is displaced at low pressure and high velocity through passages 98 controlled by the spring loaded check-valve CK into the discharge chamber 125, and, at the same time, chamber 126 is effective to augment the pressure on the fluid in chamber 125 due to the closed status of the compensating port 109. This movement of fluid from chamber 97 into chamber 125 is accommodated by the high pressure check-valve element 151 being forced from its seat which places passages 98 in communication with chamber 125 in opposition to its spring 153, such low pressure movement of fluid from chamber 125 via the discharge port 131 into the brake lines and connected wheel cylinders (not shown) is effective to quickly take-up the slack in the brake system with minimal pedal stroke.

As the pistons LP and HP are further advanced, with a consequent increase in pressure, hydraulic reaction on the actuating piston 146 induces the staging valve element 83 to unseat (see FIGURE 9), such unseating being induced by fluid pressure in the central portion of the sealing cup 105 being transmitted through the piston 146 and rod 148 to the staging-valve element 83.

Upon unseating of the staging-valve element, pressure on the fluid in chamber 97 is relieved as shown in FIGURE 9, by placing the latter chamber in communication with the axial bore 78 via passages 52, concavity, ports 63, blind bore 65 and annular chambers 23, 72 which form the static fluid chamber SC in continuous communication with the reservoir 5 via intake port 33, thus rendering the low-pressure piston LP inoperative to transfer fluid from chamber 97 to chambers 125, 126 and vice versa. Relief of pressure on the fluid in chamber 97 enables the piston LP to freely move therein with negligible resistance to pedal movement.

Accordingly, both pistons cooperate during initial movement to take-up the slack in the system, but upon rendering the low-pressure chamber 97 inoperative in the manner aforesaid, continued pressure on said pistons, develops sufficient back-pressure against the check-valve element 151 augmented by its spring load to firmly seat it to prevent low-pressure fluid in chamber 97 from entering the discharge chamber 125 via passages 98, and, as a consequence, pressure builds up in said discharge chamber 125 to such a magnitude that the installed strength of the staging valve spring 84 is overcome and the staging valve element 83 unseated as shown in FIGURE 9. In this manner, transition from low- to high-pressure operation is effected to enable the brakes to be firmly applied as required, under sole control of the high-pressure piston HP which moves fluid at high pressure and low velocity with consequent reduced effort on the pedal P.

Upon release of the applied force, the foot pedal P is returned to its fully retracted position shown in FIGURE 1 under influence of the cooperative reaction from springs 144, 96. Upon release of the pistons, the spring loaded staging-valve element 83 moves to its closed (seated) position as shown in FIGURE 1 in readiness for another brake-applying cycle.

As the pistons HP and LP return to their respective retracted positions, a partial vacuum is created in chambers 125, 126 and chamber 97, forward of said pistons, respectively, resulting in drawing fluid from the reservoir 5 through the flutes 108 indented in the outer surface of the seal lip 107, and open passages 111, respectively, it being recalled that minute retraction of the pistons at any pressurizing station thereof along their full operating stroke, is effective by means of the valve-actuating ring 167 to withdraw the compensating-valve element 157 from the confronting ends of said passages 111 to open them as best demonstrated by FIGURE 1. Actuation of the ring 167 and connected element 157 as a unit, is responsive to minute reciprocable movement of the piston-carrying member PM at closely spaced stations along its full operating stroke. Uninterrupted frictional engagement of the ring 167 with the piston-carrying extension 36, enables such minute reciprocable movements of said extension under operator-actuation, to impart like movements to the ring and connected valve element 157 to open and close the confronting ends of the passages 111, thus providing means for conditioning the low-pressure chamber 97 to be inoperative and operative respectively. When the pistons are effective in a pressurizing direction, upon closure of the compensating-valve CV by said frictional actuating ring 167, pressure subsequently developed in chamber 97 cooperates with such direction of piston movement to maintain the valve element 157 tightly seated against the ends of the passages 111.

During this releasing operation, fluid is returning to chambers 125, 126 and 97 from the wheel cylinders under influence of the retractile springs which connect the friction elements of the respective brake structures, details of which are not shown since all of this structure is conventional. Upon return of the fluid from the cylinders and brake lines, any excess fluid received by chambers 125, 126 under this condition, is displaced therefrom through the compensating port 109 connected passage 111 and fully retracted compensating-valve element 157 into chamber 97, the latter chamber normalizing the fluid therein via the open passages 111 which communicate with the reservoir 5.

A preferred and two modified embodiments of the invention have been illustrated and described, the underlying concept disclosed is obviously susceptible of other applications and structural variations that will readily occur to persons skilled in the art to which the invention relates. The invention is, therefore, to be limited only as defined by the terms of the appended claims.

Having thus described my invention, I claim:

1. In a master cylinder of the character disclosed comprising: a chamber-defining body provided with a fluid reservoir, a low-pressure cylinder open at one end and closed at the other, a low-pressure piston slidable therein, and characterized by a pressure-working side opposite a constant pressure side, a high-pressure cylinder coaxially projecting into said low-pressure cylinder, a discharge chamber in continuous communication with said high-pressure cylinder, an outlet for said discharge chamber and communicating with a brake system or the like adapted to receive actuating fluid from said master cylinder, an axially bored high-pressure piston slidable in said high-pressure cylinder said high pressure piston having an elongated cylindrical piston-carrying extension normally projecting into the low-pressure cylinder and connected to move as a unit with said low-pressure piston, a valve-actuating piston having limited sliding movement in said axial bore, a pair of transverse passages on opposite sides, respectively, of said low-pressure piston, with one of said passages interconnecting said valve bore, with the pressure-working side of the low-pressure piston, and the other passage interconnecting said axial bore with the constant-pressure side of said low-pressure piston, a staging valve-forming element disposed between said axial and valve bores, and movable from a normal position establishable in part by hydraulic pressure produced by the pressure-working side of the low-pressure piston, said position being effective to block communication between said bores to condition in part said low-pressure piston to move fluid at low pressure through said low-pressure cylinder via a port in said high-pressure cylinder into said discharge chamber, to another operating position effective to place said bores in communication with each other to render the low-pressure cylinder inoperative by interconnecting the constant and working pressure sides of said low-pressure piston, an operative connection coextensive with said axial bore between said valve-forming element and valve-actuating piston to enable said element and piston to move as a unit, a normally preloaded spring in said valve bore reacting between said valve-actuating piston and low-pressure piston to establish the relative operating movement of the valve-actuating piston with respect to the high-pressure piston and the normal operating position of the valve-forming element, said valve-actuating piston being operable relatively to the high-pressure piston in response to a predetermined back-pressure in said discharge chamber to move said valve-forming element to its other operating position in opposition to reaction from said spring, to place said bores in communication with each other thereby rendering the low-pressure piston inoperative to move fluid at low pressure, and activating the high-pressure piston to move fluid at high pressure through the said discharge chamber, a spring loaded check-valve element effective to close said port to prevent fluid in said discharge chamber under influence of said back-pressure from reacting on the pressure-working side of said low-pressure piston; another port in said high-pressure cylinder normally interconnecting said reservoir with the pressure-working side of said low-pressure piston, and a compensating valve element frictionally connected to said high-pressure piston extension, and movable thereby to close said other port in response to initial movement of said low- and high-pressure pistons as a unit, to render the pressure-working side of said low-pressure piston effective to move fluid at low pressure through the first-mentioned port; and a third port in said high-pressure cylinder normally interconnecting the other port with the interior of the latter cylinder to provide fluid compensating communication thereof with said reservoir.

2. A multi-stage master cylinder constructed in accordance with claim 1 in which the high-pressure piston comprises an outstanding annular flange having a rearwardly projecting reduced diameter portion; a counterbore in the inner end of said piston-carrying extension, into which said reduced diameter portion projects to abut the bottom of said counterbore, and the end of said piston-carrying extension into abutment with the inner marginal confronting portion of the outstanding flange; an axial bore in the reduced diameter portion merging with said first-mentioned counterbore in the high-pressure piston and coaxial with the aforesaid axial bore in the piston-carrying extension, the exposed portion of the engaged side of said outstanding flange being adapted to engage and positively move the low-pressure compensating valve element to its fully retracted position away from the ends of said longitudinal compensating passages to open the same; a plurality of longitudinal circumferentially spaced passages through the exposed portion of said outstanding flange; a cup-shaped pliant seal carried on the front face of said outstanding flange with the central portion thereof effective on the forward end of the said staging valve-actuating piston to actuate the same in response to a predetermined back-pressure from said discharge chamber; a forwardly projecting annular lip defining the periphery of said seal; a plurality of flutes in the peripheral surface of said lip; and a valve washer bonded to the heel portion of said lip adjacent the periphery thereof, and overlying the forward ends of said spaced passages in said outstanding flange to control said passages whereby fluid flow is accommodated via said spaced passages and flutes into said discharge chamber when said washer valve is substantially free of pressure thereagainst.

3. A multi-stage master cylinder constructed in accordance with claim 1 in which the closed end of the low-pressure cylinder comprises: a detachable cup-shaped cap, the inner end portion of which is formed as an outstanding flange having a peripheral threaded surface, and a central forwardly extending cylindrical hollow embossment and a reduced cylindrical extension, said threaded portion of the flange being adapted to engage a threaded counterbore defining the forward end of said low-pressure cylinder, with a portion of the peripheral marginal portion of said flange overlying the outer end of one of the compensating passages incorporated in the chamber-defining body, to close that end of said passage, the opposite end of which is in continuous communication with the fluid reservoir aforesaid.

4. In a multi-stage master cylinder, a chamber-defining body, a variable pressure discharge chamber in said body provided with a discharge port, a fluid supply reservoir in said body, a wall separating said chamber from said reservoir, a low-pressure working chamber in said body, a high-pressure smaller piston having working relation in a high-pressure chamber with said discharge chamber, a piston of larger diameter than the first-mentioned piston, adapted to work in said low-pressure working chamber to one side thereof, the opposite side of said low-pressure piston defining one side of a constant pressure chamber in said body coaxial with said low-pressure working chamber, high-pressure check-valve means having a spring-loaded movable element for controlling unidirectional flow of fluid through a plurality of associated passages in said body, from said low-pressure working chamber into said discharge chamber, the improvement which comprises: compensating-valve means having an element movable in response to fluid pressure and movement of said smaller piston transmitted through friction clutch means, to prevent unidirectional flow of fluid through a different plurality of associated passages in said body, from said reservoir into said low-pressure working chamber during protractive movement of the larger piston; a plurality of circumferentially spaced projections on said last-mentioned compensating-valve element; means for slidably supporting said last-mentioned check-valve element on said body; means for interconnecting said last-mentioned compensating-valve element with an element of said clutch means in frictional engagement with said high-pressure piston to provide limited unitary rectilinear movement thereof in response to movement of said high-pressure piston at closely spaced stations along the full operating stroke of said latter piston, said clutch means accommodating continued movement of said high-pressure piston in the same direction in which the last-mentioned compensating-valve element was moved into its operating position of control with respect to said different plurality of passages; an axial bore in said low-pressure piston closed at both ends; an intermediately positioned annular valve seat fixed in said axial bore; a staging valve-forming element cooperating with said valve seat to block communication between opposite ends of said axial bore when seated and to place said opposite ends in communication with each other when said unseated; a normally preloaded spring in said axial bore and adapted to react between one end thereof and said staging valve element to bias the latter into seated relation with its cooperating seat; a plurality of flow passages in said low-pressure piston interconnecting said constant pressure chamber with the other end of said axial bore opposite the said one end; another plurality of flow passages interconnecting said low-pressure working chamber with the one end of the said axial bore whereby unseating of said staging valve element interconnects the working and constant pressure chambers to render said working chamber inoperative; a valve-actuating piston coaxial with said high-pressure piston for actuating said stage in valve element unseated the same in opposition to said spring, in response to a predetermined back-pressure in said discharge chamber; an intake port through said separating wall interconnecting said fluid reservoir with said constant pressure chamber; a compensating port in said body adapted to interconnect said high-pressure chamber with one of said different plurality of flow passages when the high-pressure piston is fully retracted thereby accommodating fluid compensation in said high-pressure chamber; and a flow passageway system interconnecting said different plurality of flow passages with said fluid reservoir.

5. In a two-stage master cylinder having a fluid supply reservoir, a low-pressure cylinder, a low-pressure piston slidable therein, a high-pressure cylinder comprising a tubular liner coaxial with said low-pressure cylinder, a high-pressure piston of smaller diameter than said low-pressure piston, slidable in said tubular liner as a unit with said low-pressure piston, a variable pressure discharge chamber adapted to receive actuating fluid from said low- and high-pressure cylinders, a discharge outlet for said discharge chamber, check-valve means operatively associated with a plurality of passages in said tubular lines to accommodate unidirectional fluid flow from the low-pressure chamber into said discharge chamber, compensating-valve means operatively associated with a different plurality of passages in said tubular liner for controlling unidirectional fluid flow from said reservoir into said low-pressure cylinder, the improvement which comprises: an annular fluid space in the exterior of said tubular liner to accommodate unidirectional fluid flow from different plurality of passages; a compensating port in said tubular liner interconnecting the high-pressure cylinder with one of said different plurality of passages when the high-pressure piston is fully retracted; a normally preloaded spring in said low-pressure cylinder to react between said tubular liner and said low-pressure piston to urge the latter toward its normal inoperative position; staging valve means including a movable valve-forming element operatively incorporated in the low-pressure piston to isolate and interconnect a working and constant pressure chamber on opposite sides, respectively, of said last-mentioned piston; a coaxial member tightly interfitting a blind bore in said low-pressure piston to move as a unit therewith; a collar-like member tightly impinged between the interfitting end of said coaxial member and bottom of said blind bore; a fluid passageway system in said low-pressure piston interconnecting said constant pressure chamber with the interior of said collar-like member; another fluid passageway system in said low pressure piston interconnecting said working chamber with a second blind bore in said interfitting member; an annular valve seat defining the end of said collar-like member adjacent said interfitting member, said valve-forming element being movably positioned in said second blind bore to cooperatae with said valve seat whereby said two passageway systems therefore said working and constant pressure chambers, respectively, are interconnected upon said valve element disengaging from said valve seat, and to isolate said chambers when said valve seat is engaged by said valve element; another normally preloaded spring in said second blind bore adapted to react between said valve-forming element and bottom of said second blind bore to urge the latter element into engagement with its said cooperating valve seat and thereby isolate said constant and working pressure chambers to render the low-pressure working chamber operative; and means for operating said compensating-valve means to close said different plurality of passages to render said low-pressure piston operative to displace fluid from said low-pressure working chamber through the first-mentioned plurality of passages controlled by said check-valve means into said discharge chamber until a predetermined back-pressure is produced therein to react on a valve-actuating piston coaxial with said high-pressure piston to unseat said valve forming element in opposition to its spring load, and thereby render the low-pressure cylinder inoperative, and activate said high-pressure cylinder to move fluid at high pressure and low velocity from the discharge chamber through the discharge outlet therefor.

6. In a master cylinder of the character disclosed, a fluid reservoir, a low-pressure cylinder, a low-pressure piston slidable therein and characterized by a pressure-working side opposite a constant-pressure side, a high-pressure cylinder projecting coaxially into said low-pressure cylinder and characterized by an outstanding circularly flanged portion, an axially bored high-pressure piston slidable in said high-pressure cylinder, a cylindrical piston-carrying member coaxially bored with respect to said high-pressure piston and adapted to interconnect said pistons in longitudinally spaced relation to move as a unit, a dicharge chamber in continuous communication with said high-pressure cylinder, an outlet for said discharge chamber and communicating with a brake system or the like adapted to receive actuating fluid from said master cylinder, a valve-actuating piston having limited sliding movement in said axial bore, the improvement which comprises: a valve bore in said low-pressure piston and coaxial with said axial bore; a staging valve-forming element movable in said valve bore and normally positioned to block communication between said bores; a normally preloaded spring in said valve bore and adapted to react between said valve-forming element and low-pressure piston to establish said normal position; an aperture on the pressure-working side of said low-pressure piston communicating with said valve bore and a portion of said valve-forming element in normal position to render the low-pressure piston operative to move fluid at low pressure through said discharge chamber into said fluid pressure system; another aperture on the constant-pressure side of said low-pressure piston communicating with a different portion of said valve-forming element and said axial bore; an operative connection between the valve-forming element and said valve-actuating piston to enable the latter to move said valve-forming element as a unit to operating position in opposition to said spring and whereat the said two apertures are interconnected to render the low-pressure piston inoperative, said valve-actuating piston reacting to a predetermined back-pressure in said discharge chamber whereby said high-pressure piston is conditioned to move fluid at high pressure through said discharge chamber; a passage through said flanged portion of the high-pressure cylinder interconnecting the pressure-working side of the low-pressure piston with said discharge chamber; check-valve means including an element operable to accommodate flow through said passage from said low-pressure cylinder into the discharge chamber until a predetermined back-pressure becomes effective in said latter chamber; another passage in the high-pressure cylinder normally interconnecting said reservoir with the pressure-working side of said low-pressure piston; compensating-valve means including an element frictionally connected to said piston-carrying member for limited unitary operation thereby to block said other passage in response to initial movement of said pistons as a unit in a pressurizing direction, said frictional connection accommodating relative movement of said pistons in the same direction upon such unitary operation of the compensating-valve element, and thereby render the pressure-working side of the low-pressure piston effective to move fluid at low pressure through said first-mentioned passage into said discharge chamber; and a port in said high-pressure cylinder normally open to interconnect the interior thereof with the other passage to accommodate fluid compensation between said reservoir and high-pressure cylinder upon release of operating force from said pistons.

7. A master cylinder constructed in accordance with claim 6 in which said compensating valve means additionally includes: a reduced diameter portion formed by diminishing the normal outer diameter of the inner terminal portion of said high-pressure cylinder and on which said compensating valve element is movably mounted; an annular face portion defined by the juncture of the aforesaid normal and reduced diameter portions, said face portion being adapted for engagement by said compensating valve element to block said other passage which terminates flush with said latter portion; an abutment-engaging element on said reduced portion in spaced relationship to said face portion to define the relative operating movement of said compensating valve element; a plurality of circumferentially spaced projections defining the inner periphery of said compensating valve element; a like-number of cross-slots through said reduced portion and coextensive therewith, and which are adapted to match the spacing of said projections to enable the latter to project through said cross-slots; a split-type contractible actuatable element mounted on said piston-carrying member in continuous frictional engagement therewith; an external annular groove formed in said actuatable element for receiving the inner ends of said projections to interconnect said actuatable element with said compensating valve element for rectilinear movement as a unit between two extremes defining the operating stroke of said piston-carrying member whereby minute reciprocative movements of the latter member therefore both connected pistons at closely spaced stations along the full operating stroke thereof, is effective to move said actuatable element and connected compensating valve element as a unit with said piston-carrying member, to place said compensating valve element in engaging relation with respect to said face portion to block said other passage, and to withdraw said compensating valve element from said face portion to unblock said other passage, respectively, said minute reciprocative movements of said actuatable element and compensating valve element being predetermined by the spacing of said face portion and abutment-engaging element, said frictional connection providing slipping engagement of said piston-carrying member with respect to said actuatable element upon the latter being stabilized in either of its operating positions aforesaid, in the same direction of movement in which the selected operating position was established.

8. A multi-stage cylinder having a chamber-defining body provided with a fluid supply reservoir, a low-pressure cylinder, a low-pressure piston slidable therein, and characterized by a pressure-working side opposite a constant-pressure side, a high-pressure cylinder projecting coaxially into said low-pressure cylinder and communicating with a fluid pressure utilizing system, a high-pressure piston slidable in said high-pressure cylinder, and which is provided with a predetermined relative movement between two limits with respect to said low-pressure piston, a valve bore formed coaxially in said low-pressure piston, a staging valve-forming element movable in said bore between normal and operating positions of fluid control defined by said predetermined relative movement, an aperture on the pressure-working side of said low-pressure piston communicating with said valve bore and a portion of said valve-forming element in normal position wherein said low-pressure piston is operative to move fluid at low pressure and high velocity into said fluid pressure system, another aperture on the constant-pressure side of said low-pressure piston communicating with a different portion of said valve-forming element, an operative mechanical connection between said high-pressure piston and said valve-forming element for moving the latter to its operating position of fluid control wherein the two apertures aforesaid are interconnected to render said low-pressure piston inoperative to move fluid into said fluid pressure system, in response to a predetermined pressure reaction within said fluid pressure system on said high-pressure piston, a normally preloaded spring reacting between said low-pressure piston and said valve-forming element to bias the latter and said high-pressure piston as a unit in opposition to said pressure reaction to reinstate the said predetermined relative movement between said low- and high-pressure pistons upon release of operating force from said low-pressure piston, an axially-bored cylindrical extension projecting coaxially from said low-pressure piston toward said high-pressure piston, said mechanical connection being adapted to freely project through said axial bore, a fluid passage in said high-pressure cylinder between said low-pressure cylinder and said fluid pressure system, a different fluid passage in said high-pressure cylinder normally interconnecting said reservoir with the pressure-working side of said low-pressure piston, the improvement which comprises: compensating valve means including a valve-forming element movable relatively to said high-pressure cylinder to open and close said different fluid passages, a friction element mounted on the exterior of said axially-bored extension in continuous frictional engagement therewith, a mechanical connection between said friction element and said last-named valve element, said friction element being normally effective under initial movement of said low-pressure piston in a fluid-pressurizing direction at any selected position thereof along its full operating stroke, to correspondingly move said last-named valve element as a unit to close said different fluid passage for low-pressure operation to move fluid at low pressure and high velocity through said first-named fluid passage into said fluid pressure system.

References Cited by the Examiner
UNITED STATES PATENTS

| 1,892,335 | 12/32 | Engel | 60—54.6 |
| 2,162,757 | 6/39 | Shaw | 60—54.6 |
| 2,180,455 | 11/39 | Bowen | 60—54.6 |
| 2,196,190 | 4/40 | Bowen | 60—54.5 |
| 2,354,957 | 8/44 | Loweke | 60—54.6 |
| 2,392,501 | 1/46 | Pool | 251—321 |
| 2,410,169 | 10/46 | La Brie | 60—54.5 |
| 2,489,596 | 11/49 | Swain | 251—321 |

FOREIGN PATENTS

| 812,483 | 2/37 | France. |
| 431,202 | 7/35 | Great Britain. |

SAMUEL LEVINE, *Primary Examiner.*

UNITED STATES PATENT OFFICE
CERTIFICATE OF CORRECTION

Patent No. 3,171,257                                                   March 2, 1965

Glenn T. Randol

It is hereby certified that error appears in the above numbered patent requiring correction and that the said Letters Patent should read as corrected below.

Column 1, line 18, after "1961" insert -- now Patent No. 3,166,907 dated January 26, 1965 --; line 38, for "cylinder respectively" read -- cylinder, respectively, --; line 39, for "systems" read -- system --; same column 1, line 40, for "pottet-type" read -- poppet-type --; column 4, line 12, for "rthe" read -- the --; line 18, for "provide" read -- provides --; column 5, line 6, for "previouslly" read -- previously --; column 8, line 29, for "accommodate" read -- accommodates --; line 57, for "associate" read -- association --; column 10, line 59, for "intended" read -- indented --; line 63, for "match" read -- matches --; column 11, line 6, for "wear" read -- wears --; line 17, for "effect" read -- effects --; same line 17, for "at" read -- by --; line 21, for "stations" read -- station --; same column 11, line 27, for "relieve" read -- relieving --; column 15, line 50, after "concavity" insert -- 51 --; column 16, line 30, after "operative" insert a comma; column 18, line 71, strike out "said", first occurrence; column 19, line 9, for "stage in" read -- staging --; same line 9, after "element" insert -- by --; line 32, for "lines" read -- liner --; line 39, for "to accommodate unidirectional fluid flow from" read -- adapted to interconnect said reservoir with said --; same column 19, line 64, for "cooperatae" read -- cooperate --.

Signed and sealed this 22nd day of February 1966.

(SEAL)
Attest:

ERNEST W. SWIDER                                       EDWARD J. BRENNER
Attesting Officer                                      Commissioner of Patents